(12) United States Patent
Schreuder et al.

(10) Patent No.: US 9,205,890 B2
(45) Date of Patent: Dec. 8, 2015

(54) FOLDABLE SCOOTER

(71) Applicant: LEEV Mobility B.V., Amsterdam (NL)

(72) Inventors: Marcel Arthur Jan Schreuder, Amsterdam (NL); Johan Sebastian Van Oost, Taichung (TW); Josephus Petrus Kock, Amsterdam (NL); Renze Jan Rispens, Amstelveen (NL); Giovanni Doci, Lucerne (CH)

(73) Assignee: Leev Mobility BV, Amsterdam (NL)

( * ) Notice: Subject to any disclaimer, the term of this patent is extended or adjusted under 35 U.S.C. 154(b) by 0 days.

(21) Appl. No.: 14/378,470

(22) PCT Filed: Feb. 14, 2013

(86) PCT No.: PCT/NL2013/050084
§ 371 (c)(1),
(2) Date: Aug. 13, 2014

(87) PCT Pub. No.: WO2013/122461
PCT Pub. Date: Aug. 22, 2013

(65) Prior Publication Data
US 2015/0084312 A1   Mar. 26, 2015

(30) Foreign Application Priority Data
Feb. 16, 2012   (NL) .................................... 2008301

(51) Int. Cl.
*B62M 1/00*     (2010.01)
*B62K 15/00*    (2006.01)
*B62K 3/00*     (2006.01)

(52) U.S. Cl.
CPC ............... *B62K 15/006* (2013.01); *B62K 3/002* (2013.01)

(58) Field of Classification Search
CPC .... B62K 15/006; B62K 15/008; B62K 3/002; B62K 11/14
USPC .................... 280/87.05, 87.041, 287; 180/208
See application file for complete search history.

(56) References Cited

U.S. PATENT DOCUMENTS

| | | | | |
|---|---|---|---|---|
| 3,746,113 A | * | 7/1973 | Tidwell | 180/224 |
| 5,388,659 A | * | 2/1995 | Pepe | 180/219 |

(Continued)

FOREIGN PATENT DOCUMENTS

| | | |
|---|---|---|
| AT | 507949 A1 | 9/2010 |
| EP | 0362033 | 4/1990 |

(Continued)

OTHER PUBLICATIONS

International Search Report and Written Opinion from the European Patent Office mailed Jul. 16, 2013 for corresponding International Application No. PCT/NL2013/050084, filed Feb. 14, 2013.

*Primary Examiner* — Brodie Follman
(74) *Attorney, Agent, or Firm* — Steven M. Koehler; Westman, Champlin & Koehler, P.A.

(57) ABSTRACT

Foldable scooter comprising a footboard, a front wheel, a rear wheel and a steer. The front wheel is suspended to a front frame carrying the steer. The front frame is connected to the footboard by a lockable hinge allowing hinging about a hinging axis by the front frame relative to the footboard between a position for use and a folded position. One or more extensions of the front frame are slideably received in a support frame of the footboard. A rod pivotably connects the footboard support frame to the front frame at a distance below the hinging axis.

14 Claims, 8 Drawing Sheets

(56) References Cited

U.S. PATENT DOCUMENTS

| | | | |
|---|---|---|---|
| 5,775,452 A * | 7/1998 | Patmont | 180/181 |
| 5,848,660 A * | 12/1998 | McGreen | 180/220 |
| 5,954,349 A * | 9/1999 | Rutzel | 280/87.041 |
| 6,283,485 B1 * | 9/2001 | Tsai | 280/87.05 |
| 6,305,698 B1 * | 10/2001 | Liang | 280/87.041 |
| 6,460,866 B1 * | 10/2002 | Altschul et al. | 280/30 |
| 6,581,492 B1 * | 6/2003 | Chen | 74/551.3 |
| 6,616,154 B1 * | 9/2003 | Neuhold | 280/87.05 |
| 6,619,683 B1 * | 9/2003 | Lin et al. | 280/270 |
| 6,623,023 B2 * | 9/2003 | Niitsu et al. | 280/278 |
| 6,805,368 B1 * | 10/2004 | Chen | 280/87.041 |
| 6,848,697 B2 * | 2/2005 | Lan | 280/87.05 |
| 8,162,090 B2 * | 4/2012 | Atherton et al. | 180/208 |
| 8,613,458 B2 * | 12/2013 | Ghisolfi et al. | 280/87.05 |
| 8,720,918 B2 * | 5/2014 | Liao | 280/87.05 |
| 8,801,009 B2 * | 8/2014 | Sapir | 280/87.05 |
| 2002/0029918 A1 * | 3/2002 | Patmont et al. | 180/220 |
| 2002/0093161 A1 * | 7/2002 | Udwin et al. | 280/87.05 |
| 2003/0214108 A1 * | 11/2003 | Lan | 280/87.05 |
| 2005/0230929 A1 * | 10/2005 | Chen | 280/87.05 |
| 2009/0115167 A1 * | 5/2009 | Chin et al. | 280/639 |
| 2010/0044137 A1 * | 2/2010 | Atherton et al. | 180/223 |
| 2011/0031711 A1 * | 2/2011 | Grossman | 280/87.041 |
| 2012/0018968 A1 * | 1/2012 | Joslin et al. | 280/87.041 |
| 2012/0104714 A1 * | 5/2012 | Sapir | 280/87.05 |
| 2013/0167684 A1 * | 7/2013 | Wang et al. | 74/551.4 |
| 2014/0008882 A1 * | 1/2014 | Liao | 280/40 |
| 2014/0196968 A1 * | 7/2014 | Bieler et al. | 180/181 |
| 2015/0084312 A1 * | 3/2015 | Schreuder et al. | 280/639 |

FOREIGN PATENT DOCUMENTS

| | | |
|---|---|---|
| EP | 0362033 A1 | 4/1990 |
| EP | 0836985 A2 | 4/1998 |
| FR | 2818608 A1 | 6/2002 |
| FR | 2843088 A1 | 2/2004 |
| WO | 9846474 A2 | 10/1998 |
| WO | 2011136541 A2 | 11/2011 |

* cited by examiner

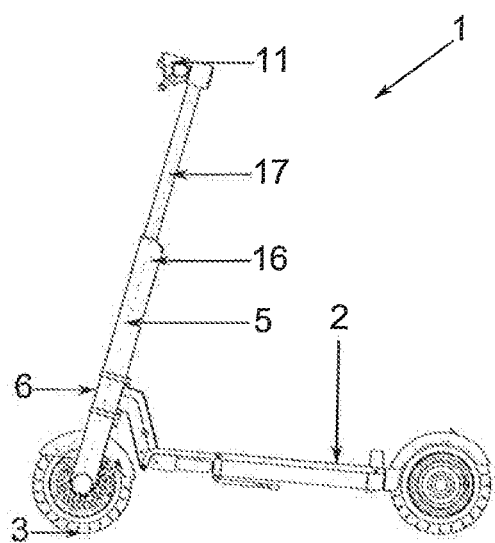
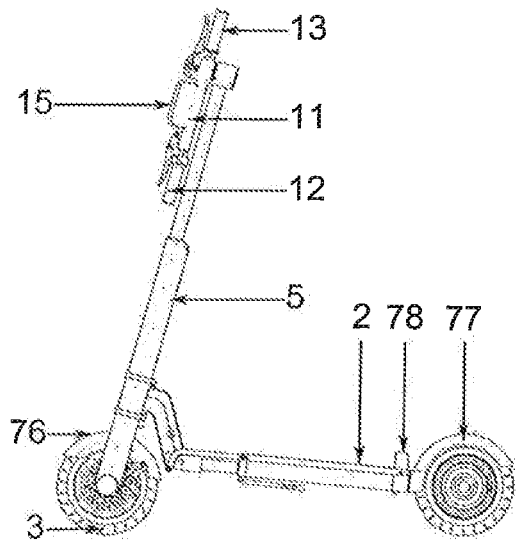
Fig. 4A　　　　　　　　　Fig. 4B
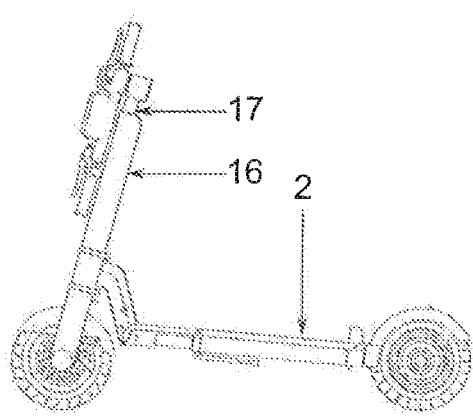
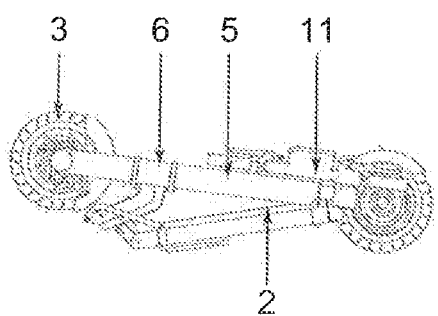
Fig. 4C　　　　　　　　　Fig. 4D

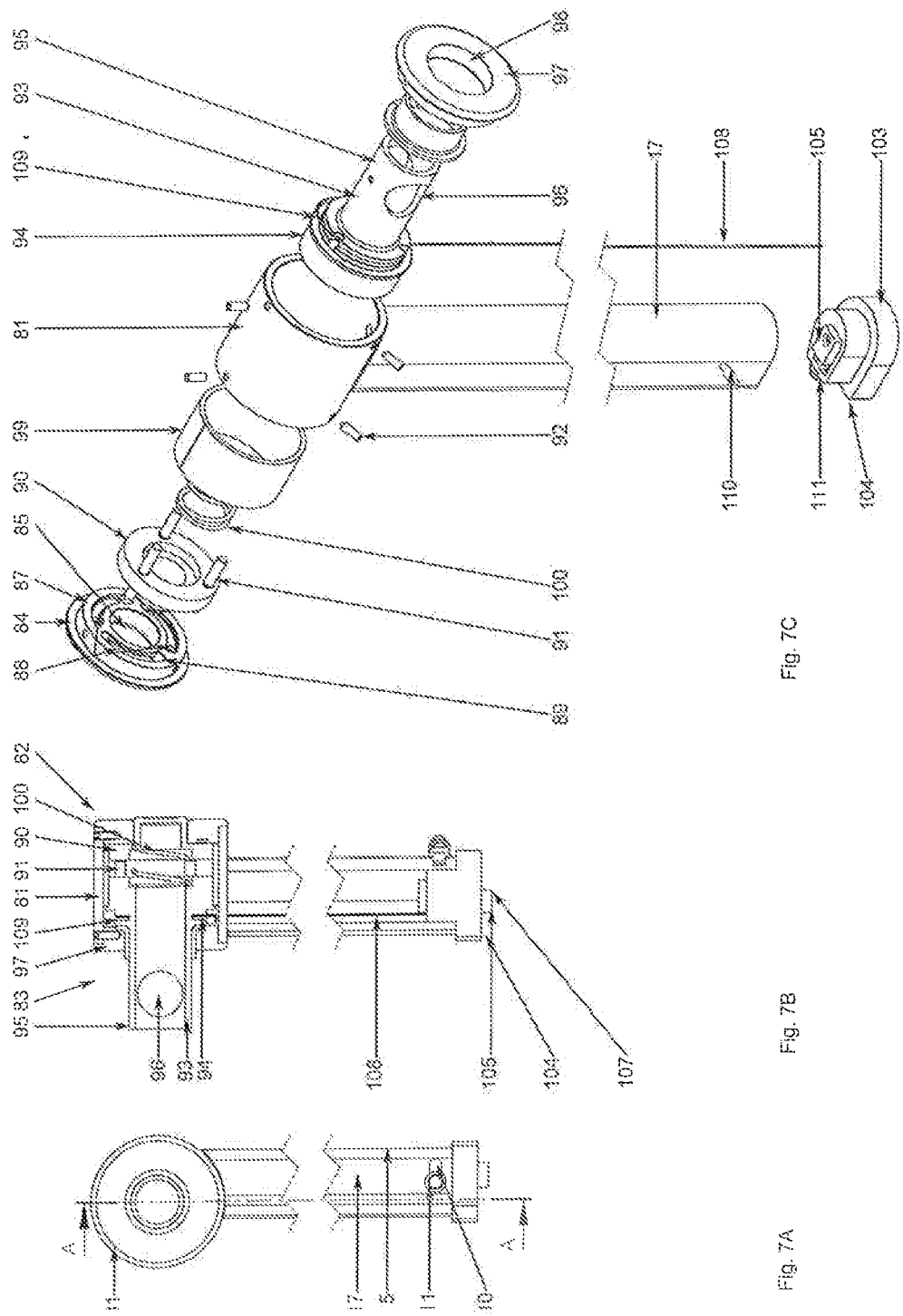

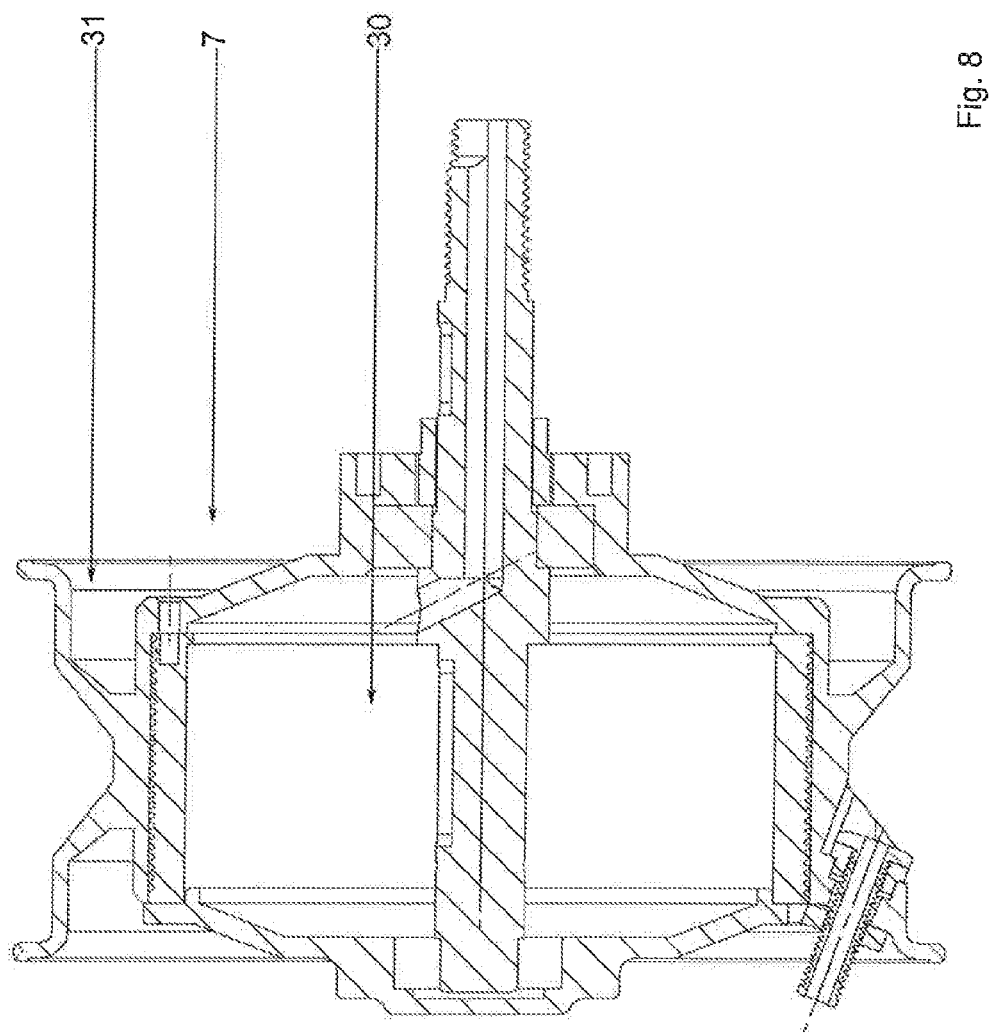

FOLDABLE SCOOTER

CROSS-REFERENCE TO RELATED APPLICATION

This application is a Section 371 National Stage Application of International Application PCT/NL2013/050084 filed Feb. 14, 2013 and published as WO2013/122461 A1 in English.

BACKGROUND

The discussion below is merely provided for general background information and is not intended to be used as an aid in determining the scope of the claimed subject matter.

The present invention relates to a foldable scooter, in particular to a motorized scooter.

EP 0 836 985 discloses a collapsible scooter. The distance between the wheels determines the size of the scooter also when it is in its collapsed state.

EP 0 362 033 discloses a scooter which can be folded by hinging the front wheel suspension rearwardly. The steering bar must subsequently be folded forwardly over the front wheel.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background An aspect of the invention is achieved with a scooter comprising a footboard, at least one front wheel, at least one rear wheel, a steer, and a front frame carrying the steer, the front frame being connected to the footboard by a lockable hinge allowing hinging of the front frame relative to the footboard between a position for use and a folded position. One or more extensions of the front frame, such as pipe sections, are telescopically connected to a support of the footboard, e.g., slideably received in complementary receiving cavities of a footboard support frame. A rod has one section pivotably connected to the footboard support and one section pivotably connected to the front frame at a connection point at a distance below the hinging axis. This way, by folding the front frame with the steer backward, the connection point of the rod to the front frame is pulled forward and the rod forces the front frame extensions to slide together telescopically. This way, the length of the scooter in its folded position is substantially less than in its position for use. The scooter can be folded into a much more compact condition.

The rod can for instance comprise a single rod or two or more parallel rods pivotable about the same pivoting axes. In a specific embodiment, the rod can comprise two symmetrically arranged J-shaped rods with a straight section arranged parallel to a side edge of the footboard when the scooter is in the use position, and a downwardly curved end with the pivotable connection to the front frame.

The lockable hinge allows folding of the front frame and the steer towards the footboard, e.g., typically about a hinging axis which is substantially perpendicular to the steering axis and substantially parallel to the wheel axes.

The front frame holds the steer, e.g., by means of a head set, allowing steering movement of the steer and the front wheel about a steering axis.

An aspect of the invention is also achieved with a scooter comprising a footboard, a front wheel, a rear wheel and a steer, wherein the steer comprises a steering bar which is parallel to and laterally spaced from a steering axis extending through the front wheel center, and a free space at the opposite side of the steering axis and wherein the front wheel is rotatably suspended to one side of the lower end of the steering bar. Accordingly, the steer does not have a further steering bar arranged symmetrically to the steering bar at the opposite side of the steering axis. Preferably, the steering bar is spaced from the steering axis over such a distance, that the eccentric steering bar can be folded down without being hindered by the rear wheel.

In a specific embodiment, the wheel suspension of the rear wheel and the wheel suspension of the front wheel are at opposite lateral sides of the scooter. This way, the rear wheel suspension does not hinder folding of the eccentric steering bar.

In a specific embodiment, the steer comprises a handlebar centered relative to the steering axis and the front wheel. Being carried by a steering bar at a distance from the steering axis the handlebar will be positioned eccentrically on top of the steering bar, so the grip at one side of the steering bar will be larger than the opposite grip.

To enable further folding of the scooter the handlebar can for instance be connected to the steering bar with a lockable hinge allowing hinging between a position for use and a folded position substantially parallel to the steering bar.

Optionally, the steering bar can be telescopically retractable and extendible. The steering bar can for instance be locked in the extended position to avoid unintentional collapsing.

In a specific embodiment, the lockable hinge of the handlebar may for instance comprise a cylindrical lock housing and a cylindrical handle bar support at least partly fitting coaxially within the lock housing. A tracer pin guiding, with one or more pins guided by means of corresponding slots, can be used to guide rotation of the handle bar support relative to the lock housing about a tilting axis substantially perpendicular to the handlebar between the folding position and the position for use of the handle bar. In such an embodiment a tensioner can be used to transmit rotational movement of the handle bar support to movement of a locking pin between a retracted position and a locking position to lock telescopically moveable parts of the steering bar. The tensioner can for example be a tension cable or a tensile bar. A wedge can for instance be used to transmit vertical movement of the tensioner to lateral movement of the locking pin.

Optionally, the scooter can be provided with an electric motor or other driving means. Such an electric motor can be hidden from view by positioning it within one of the wheels, in particular the rear wheel. Optionally, a battery and/or associated electronics can be integrated within the footboard and/or other parts of the scooter.

The scooter can for example have a steerable front wheel aligned with the rear wheel when the steer is in its central position. Alternatively, the scooter can have two or more rear wheel and/or two or more front wheels, if so desired.

BRIEF DESCRIPTION OF THE DRAWINGS

Aspects of the invention will be further explained under reference to the accompanying drawings.

FIGS. 4A-D: shows in side view consecutive steps of folding the scooter of FIG. 1;

FIG. 7A: shows the steering bar of the scooter of FIG. 1 in front view;

FIG. 7B: shows the steering bar section in longitudinal cross section along line A-A of FIG. 7A;

FIG. 7C: shows the steering bar section of FIG. 7A in exploded view;

FIG. 8: shows the wheel rim of the rear wheel of the scooter of FIG. 1 in cross section.

DETAILED DESCRIPTION OF THE ILLUSTRATIVE EMBODIMENTS

Figure 1:
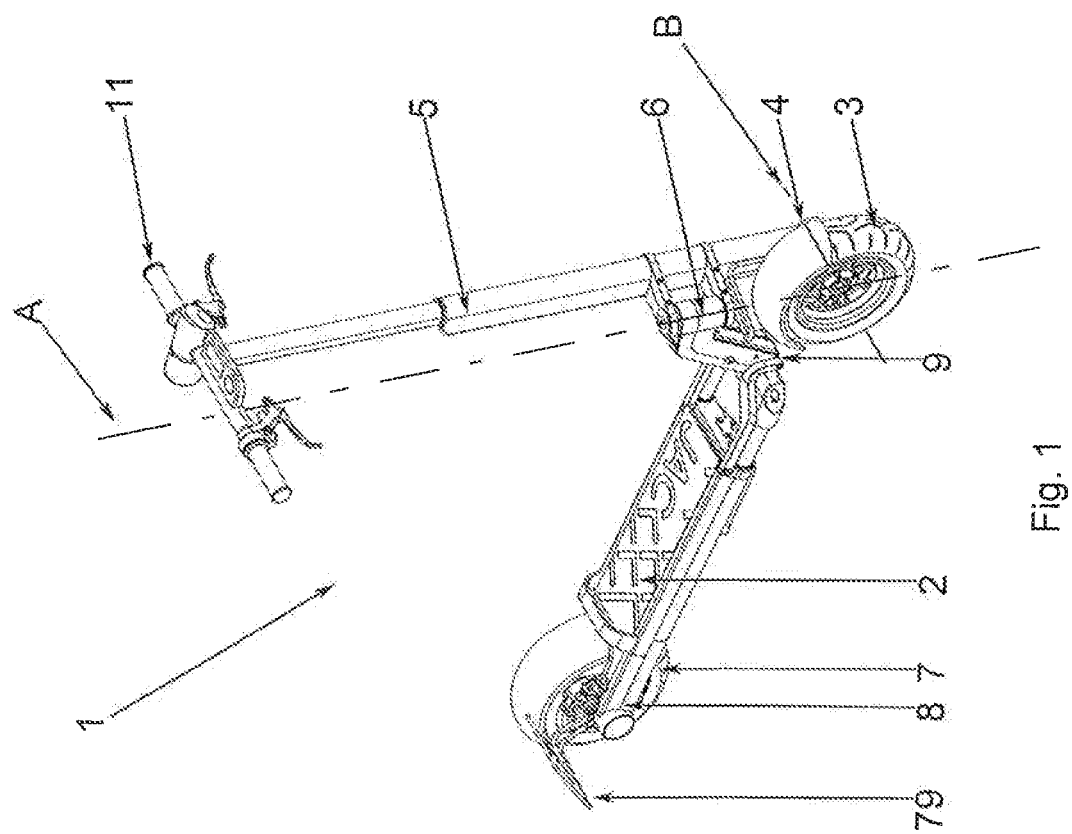
FIG. 1: shows in perspective view a scooter.
Figure 5A:
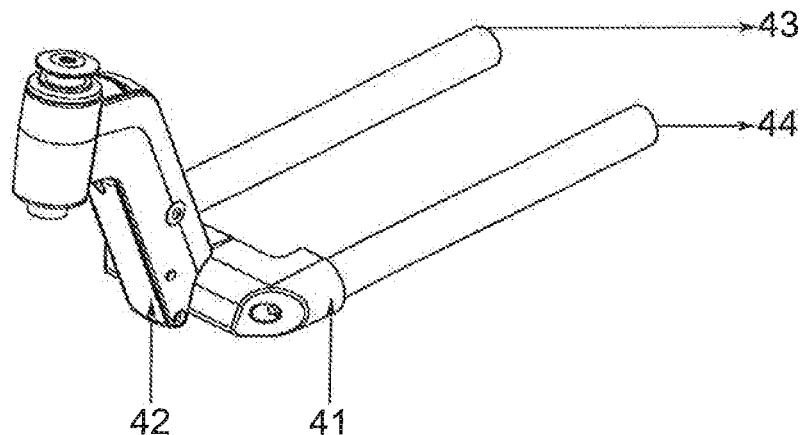
FIG. 5A: shows in perspective view a front frame of the scooter of FIG. 1.
Figure 5B:
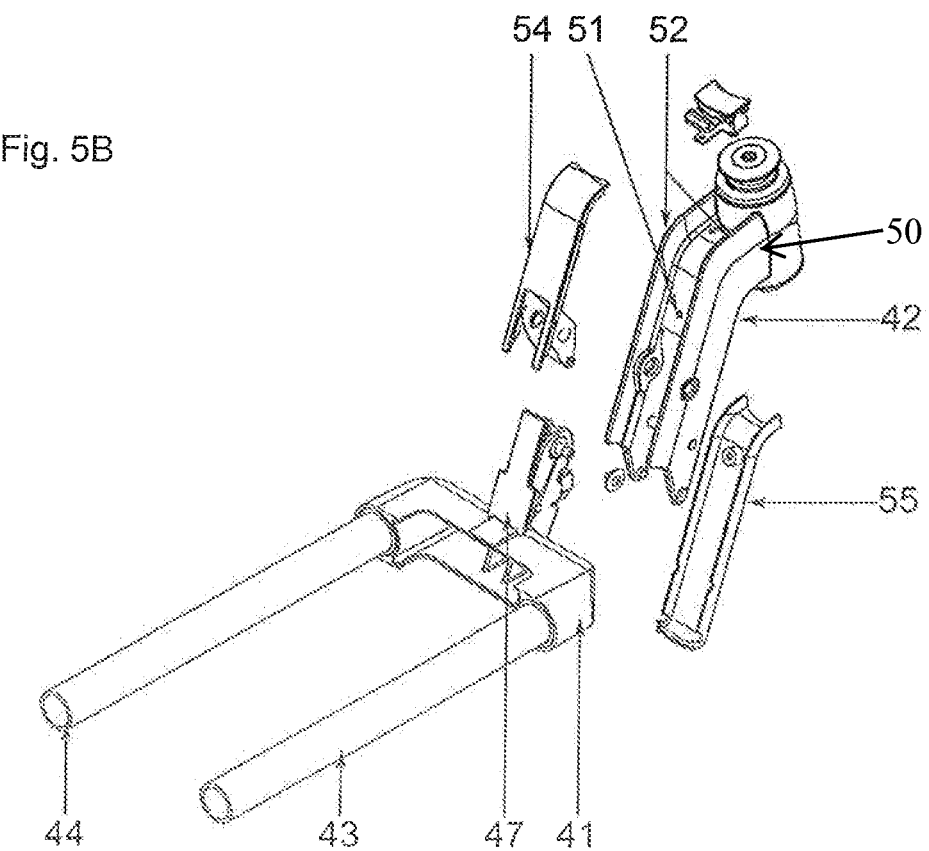
FIG. 5B; shows the front frame of FIG. 5A in exploded view.

FIG. 1 shows a scooter 1 with a footboard 2. A front wheel 3 is rotatably suspended to the lower end 4 of a steering bar 5 which is in turn rotatably connected to a front frame 6, shown in more detail in FIGS. 5A and 5B. A rear wheel 7 is rotatably suspended to a wheel suspension 8 extending from the rear end of the footboard 2 at one side of the rear wheel 7. A lockable hinge 9 connects the front frame 6 to the footboard 2. The hinge 9 construction is shown in more detail in FIGS. 6A-C.

Figure 2:
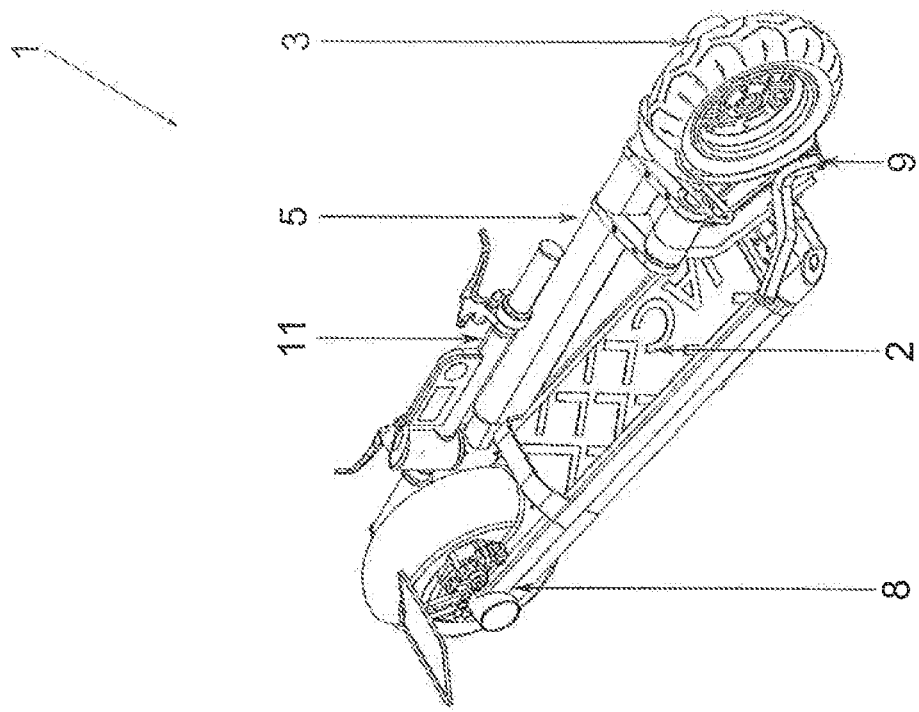
FIG. 2: shows the scooter of FIG. 1 in folded position.

The lockable hinge 9 allows hinging of the front frame 6 relative to the footboard 2 between a position for use, as shown in FIG. 1, and a folded position, as shown in FIG. 2. In the position for use the front and rear wheels 3, 7 are in line and the footboard 2 extends between the two wheels 3, 7. The footboard 2 makes an angle of about 5 degrees with the horizontal, while the steering bar 5 makes an angle of about 15 degrees with the vertical. In the folded position the distance between the front wheel 3 and the rear wheel 7 is shorter than in the position for use and the front frame 6 with the front wheel 3 is tilted to a position above the top side of the footboard 2.

Figure 3A:
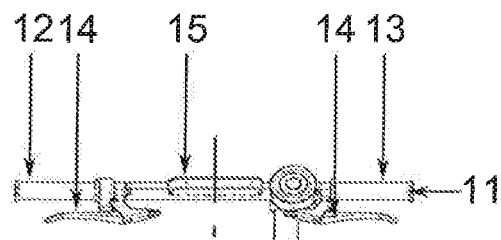
FIG. 3A: shows the scooter of FIG. 1 in front view.
Figure 3A:
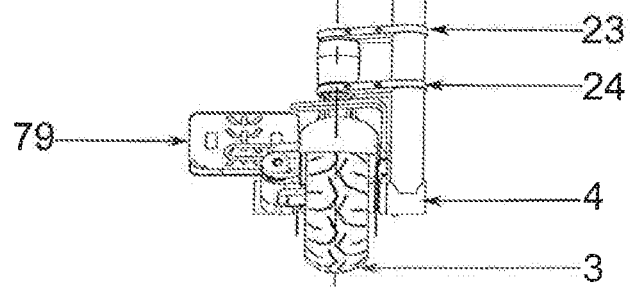

A backwardly inclining virtual steering axis A crosses the front wheel center axis B in a direction parallel to the steering bar 5. The steering bar 5 is laterally spaced from the steering axis A at a distance corresponding to at least half the width of the front wheel 3 (see in particular FIG. 3A).

The top end 10 of the steering bar 5 carries a handlebar 11 centered relative to the steering axis A and the front wheel 3. Since the steering bar 5 is at a lateral distance from the steering axis A, the handlebar 11 is eccentric relative to the steering bar 5, as is particularly shown in FIG. 3A. As a result the handlebar 11 has a longer handle grip 12 above the front wheel 3 and a shorter handle grip 13 at the opposite side of the steering bar 5. Both handle grips 12, 13 are provided with an actuator 14 for a handbrake. A display 15 is positioned between the two hand brakes 14 providing information, e.g., about driving speed.

The handlebar 11 is connected to the steering bar 5 with a lockable hinge allowing hinging between a position for use, (see FIGS. 1, 3A and 4A) and a folded position. In the folded position the handle bar 11 is substantially parallel to the steering bar 5, as shown in FIG. 4B.

The steering bar 5 is telescopically retractable and extendible. To this end the steering bar 5 comprises a lower pipe 16 and an upper pipe 17 of a smaller diameter, such that the upper pipe 17 is telescopically slideable within the lower pipe 16. This way, the steering bar 5 can be retracted when the scooter 1 is folded (see FIG. 4C), and extended when the scooter 1 is prepared for use (FIGS. 4A and 4B). The steering bar 5 can be locked in the extended position as well as in the folded position, as explained hereinafter under reference to FIGS. 7A-C.

Figure 6B:
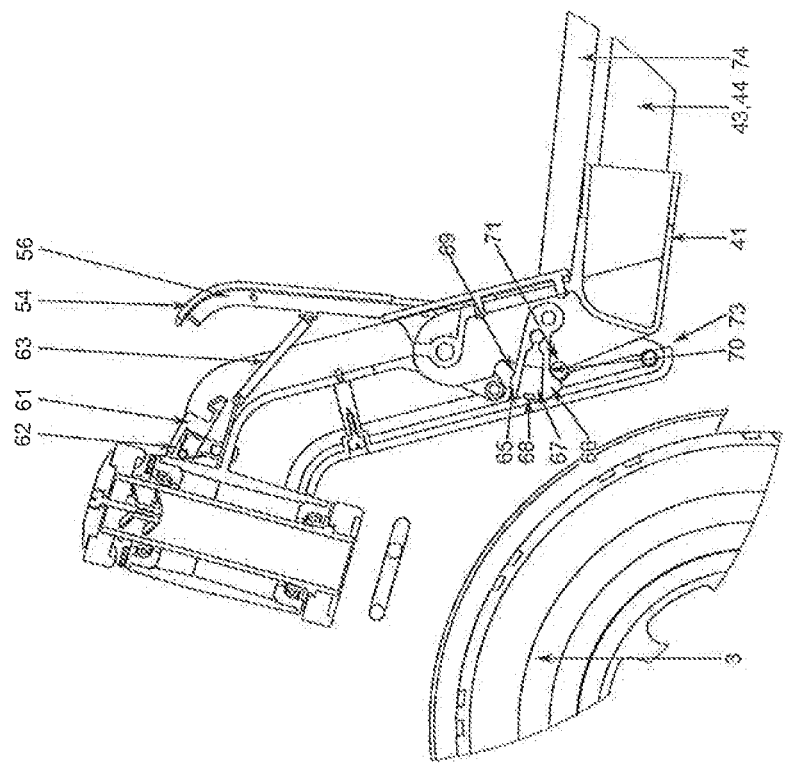
FIGS. 6A-C: shows in detail a cross sectional view of the lockable hinge during folding.
Figure 6A:
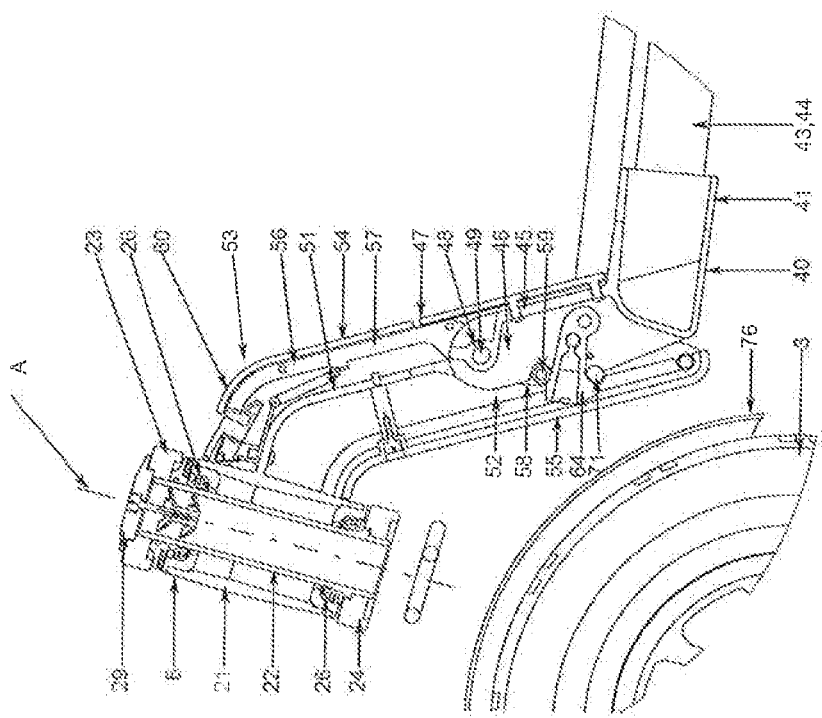
Figure 6C:
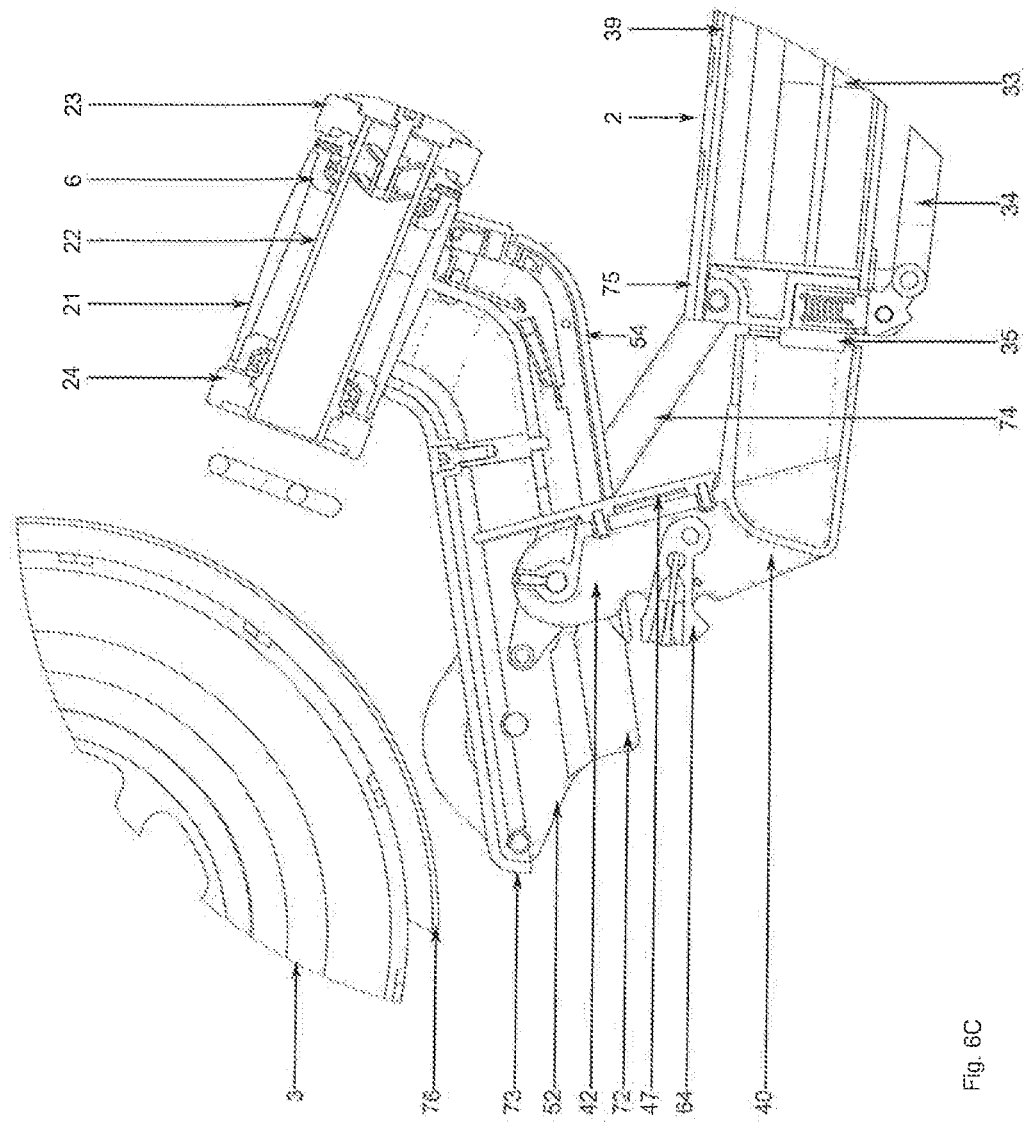

As particularly shown in FIG. 6A-C the front frame 6 comprises an outer cylinder 21 defining the steering axis A, and an inner cylinder 22 coaxially arranged within the outer cylinder 21. Both ends of the inner cylinder 22 are rigidly connected to respective supports 23, 24 holding the steering bar 5 (see FIG. 3A). The inner cylinder 22 is rotatably held in the outer cylinder 21 by means of bearings 25, 26 at both ends of the outer cylinder 21. This way the steering bar 5 can rotate with the supports 23, 24 and the inner cylinder 22 about the steering axis A. The upper end of the inner cylinder 22 is closed off by a sealing element 29.

The scooter 1 is provided with an electric motor 30 which is integral in the wheel rim 31 of the rear wheel 7, as shown in FIG. 8. A battery 33, operatively connected to the electric motor, is integrated within the footboard 2 (see FIG. 6C), together with associated electronics.

Figure 3B:
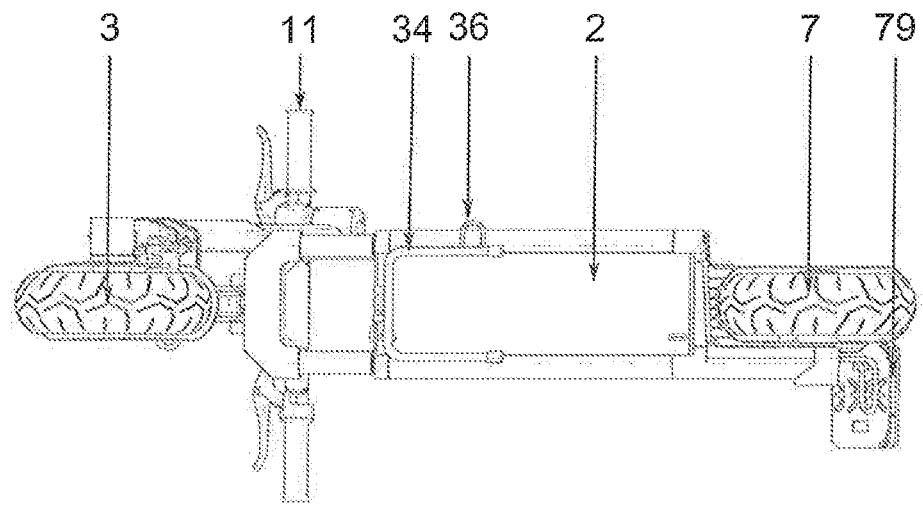
FIG. 3B: shows the scooter of FIG. 1 in bottom view.

The footboard 2 is provided with a retractable U-shaped stand 34 (see FIG. 3B) movable between a retracted position parallel to the lower side of the footboard 2, as shown in the drawings and a supporting position to support the scooter 1 when it stands still. A spring 35 (see FIG. 5) biases the stand 34 to either one of these two positions. A lateral projection 36 (see FIG. 3B) of the stand 34 extends from below the footboard 2 enabling actuation by a users foot.

FIGS. 6A-C show in cross section the folding mechanism of the lockable hinge between the front frame and the footboard 2 in more detail.

In FIG. 6A the scooter 1 is in the position for use. A coupling member 40 comprises a substantially horizontal U-shaped rear part 41 (see FIGS. 5A and 5B), and an upwardly extending front part 42. The U-shaped rear part 41 comprises two rearwardly extending parallel pipe sections 43, 44 slideably received within a support frame 39 of the footboard 2. The upwardly extending front part 42 is U-shaped in cross section, comprising a central web 45 and two parallel lateral webs 46 perpendicular to the central web 45. A cover plate 47 is attached to the central web 45 to hide it from view. A hollow cylindrical part 48 connects the two lateral webs 46 and forms a bearing for a hinging axle 49 connecting the coupling member 40 to the front frame 6 and defining the axis of rotation of the lockable hinge 9.

The front frame 6 comprises an H-shaped profile 50 with a midplane web 51 and two lateral webs 52. At its upper end 53 the H-shaped profile 50 makes a curved angle to join the outer cylinder 21 of the front frame 6 perpendicularly.

The open sides of the H-shape are closed off with cover plates 54, 55. The cover plate 54 at the rear side is part of a lever 56, which is hingeable about the hinging axle 49. Below the cover plate 55 the lever 56 comprises two ribs 57 extending to the hinging axle 49 and to an opposite end to form a second, shorter arm 58 at both sides of the upwardly extending front part 42 of the coupling member 40. A locking axle 59 extends between the outer ends of the two symmetrically arranged shorter arms 58 of the lever 56. The locking axle 59 can be moved up and down by moving the lever 56.

The top end 60 of the lever 56 can be gripped by pushing down a flap 61 (see FIG. 6B). The flap 61 is in line with the adjacent cover plate 54 and is positioned adjacent the outer cylinder 21 of the front frame 6. The flap 61 can be pushed inwardly against the action of a torsion spring 62, which will push back the flap 61 into its original position after actuation of the flap 61 has stopped.

After gripping the lever 56 it can be pulled rearwardly against the action of a draw spring 63. The draw spring 63 will pull back the lever 56 to its original position after the user releases the lever 56.

A lock 64 is rigidly fixed between the two lateral webs 46 of the front part 42 of the coupling member 40. The lock 64 comprises two legs 65, 66, a wedge 67 held between the two legs 65, 66 and an adjusting screw 68. By screwing the adjusting screw 68 the wedge 67 can push the two legs 65, 66 to a desired mutual distance.

The upper leg 65 of the lock 64 comprises a curvature 69 cooperating with the axle 59 at the outer end of the second arm 58 of the lever 56. Similarly, the lower leg 66 comprises a curvature 70 cooperating with a second axle 71 with a fixed position between the two lateral webs of the H-shaped profile 50.

In the position for use the lock 64 is firmly clamped between the two axles 59, 71. As a result, the coupling member 40 with the footboard 2 and the front frame 6 with the front wheel 3 and steering bar 5 are fixed relative to each other and the scooter 1 cannot be folded. By pulling the lever 56 rearwardly, the axle 59 at the outer end of the second arm 58 of the lever 56 releases the lock 64, as shown in FIG. 6B. The front frame 6 can then be rotated about the hinging axis 49 to unhook the second axle 71 and to put the scooter 1 into the folded position, as shown in FIG. 6C. In this position, the outer edge of the cover plate 54 of the lever 56 abuts the cover plate 47 of the upwardly extending part 42 of the coupling member 40.

While the midplane web 51 of the H-shaped profile stops at a distance before the hinging axle 49, the lateral webs 52 extend beyond this point and have an outer edge 72 with a contour matching the contour of the U-shaped rear section 41 of the coupling member 40. At the lower point of this contoured edge 72 the lateral webs 52 of the H-shaped profile 50 are connected to a first end 73 of a J-shaped rod 74, which has a second end 75 connected to the outer end of the footboard 2. When the scooter 1 is folded, the J-shaped rod 74 pushes the coupling member 40 rearwardly relative to the footboard 2 and slides the pipe sections 43, 44 into the footboard support frame 39. This way, the J-shaped rod 74 and the pipe sections 43, 44 form a transmission for reduction of the distance between the front wheel 3 and rear wheel 7 when the scooter 1 is folded.

The front and rear wheels 3, 7 are shielded by mudguards 76, 77. Just in front of the rear wheel 7 the footboard 2 is provided with a handle bracket 78 for easier carrying. Optionally, the scooter 1 is provided with a license plate holder 79.

FIGS. 7A-C show the upper pipe 17 of the steering bar 5. The top end of the upper pipe 17 is capped with a cylindrical lock housing 81 with a rear end 82, facing the user when the scooter 1 is in use, and a front end 83 at the opposite side. In front view (see FIG. 7A) the lock housing 81 is slightly offset from the longitudinal axis of the upper pipe 17. The rear end 82 is closed off with an annular plate 84 with a central opening 85. A push button 86 projects through the central opening 85. The back side of the annular plate 84 is shown in FIG. 7C. At this side the annular plate 84 comprises a circular rim 87 provided with three slots 88 each spanning a quarter of a circular segment. The outer ends of the slots 88 are deepened with an additional circular recess 89.

The push button 86 is connected to a ring 90 within the lock housing 81 abutting the circular rim 87 of the annular plate 84. Three equidistantly arranged parallel pins 91 project from both sides of the ring 90. The pins 91 are received in the slots 88 of the rim 87 annular plate 84. In the folded position of the scooter 1 each pin 91 rests in a recess 89 at one side of the respective slot 88, whereas in the position for use the pin rests in the recess 89 at the opposite end of the respective slot 88.

The annular plate 84 is fixed to the cylindrical lock housing 86 by three socket screws 92.

A cylindrical handle bar support 93 comprises one end 94 with an enlarged outer diameter extending coaxially into the cylindrical lock housing 81. The other end 95 is provided with lateral openings 96 which are circular in side view. The handle bar 11 (not shown in FIGS. 7 and 8) extends through these lateral openings 96 in a direction substantially perpendicular to the upper pipe 17 and the handle bar support 93. The end 94 with enlarged outer diameter is held within the cylindrical lock housing 81 by means of an annular plate 97 with a central opening 98 allowing passage of the handle bar support 93. The ends of the pins 91 projecting from the ring 90 are received in matching openings in the enlarged diameter end 94 of the handle bar support 93.

An bushing 99 is tightly fit between the inner surface of the lock housing 81 on the one hand and the enlarged diameter head 94 with the ring 90 on the other. The bushing 99 can be made of a low friction material, such as a PVDF, to minimize forces required to rotate the adjacent parts relative to each other.

A compression spring 100 between the enlarged diameter end 94 and the ring 90 with the button 86 biases the latter to a position where it abuts the rim 87 of the annular plate 84. In that position the pins 91 are received in the recesses 89 at the outer ends of the slots 88. As a result, the ring 90, the handle bar support 93 and the handle bar 11 are blocked and cannot be rotated relative to the annular plate 84 and the lock housing 81.

When the button 86 is pushed against the action of the compression spring 100, the pins 91 are pushed out off the recesses 89, but not out off the slots 88. A user can now turn the handle bar 11 between the folded position and the position for use. The handle bar support 93 is rotated with the handle bar 11. The ring 90 rotates with the handle bar support 93 by means of the pins 91, which are guided in the slots 88. When the pins 91 reaches one of the outer ends of the respective slots 88 the pins 91 will click into the respective recess 89 and the position of the handle bar 11 relative to the lock housing 81, either in the folded position or in the position for use.

The lower end of the upper pipe 17 is closed off with a matching plug 103 with a rectangular opening 104 receiving a wedge 105 with a top end 106 of smaller width than its bottom end 107. A tension cable 108 is tensioned between the top end 106 of the wedge 105 and the enlarged diameter end 94 of the handle bar support 93. The enlarged diameter head 94 is provided with a circumferential recess 109 for winding the tension cable 108.

At the level of the plug 103 the inner pipe is provided with an opening 110. A pin 111 abutting the wedge 105 is slideable in its longitudinal direction and projects through the opening 110.

When the handle bar 11 is rotated to the position for use, the tension cable 108 is pulled upwardly and wound in the circumferential recess 109 of the enlarged diameter end 94 of the handle bar support 93. The wedge 105 is pulled upwardly, pushing the pin 111 outwardly against the action of a compression spring (not shown). This way, the pin 111 will be shift into a matching opening at the top end of the lower pipe of the steering bar 5 to lock the position of the upper pipe 17 relative to the lower pipe 18 in the position for use.

When the handle bar 11 is turned into its folded position, the pin 111 is biased backward, pushing down the wedge 105 enabling sliding of the upper pipe 17 into the lower pipe 18.

The invention claimed is:

1. A scooter comprising a footboard, a front wheel, a rear wheel, a steer, and a front frame carrying the steer, the front frame being connected to the footboard by a lockable hinge allowing hinging about a hinging axis by the front frame relative to the footboard between a position for use with the front wheel and rear wheel configured to support the footboard for a user to ride thereon, and a folded position, wherein one or more extensions of the front frame are telescopically connected to a support of the footboard, and wherein a rod pivotably connects the footboard support to the front frame at a distance below the hinging axis.

2. The scooter according to claim 1 wherein the rod comprises a pair of symmetrically arranged J-shaped rods both having a straight section arranged parallel to a side edge of the footboard when the scooter is in the use position, and a downwardly curved end with the pivotable connection to the front frame.

3. The scooter according to claim 1 wherein the steer comprises a steering bar which is parallel to and laterally spaced from a steering axis extending through a center of the front wheel, and wherein the front wheel is rotatably suspended to one side of a lower end of the steering bar.

4. The scooter according to claim 3 wherein the wheel suspension of the rear wheel and the wheel suspension of the front wheel are at opposite lateral sides of the scooter.

5. The scooter according to claim 3 wherein the steer comprises a handlebar centered relative to the steering axis and the front wheel.

6. The scooter according to claim 5 wherein the handlebar is connected to the steering bar with a lockable hinge allowing hinging between the position for use and the folded position substantially parallel to the steering bar.

7. The scooter according to claim 6 wherein the lockable hinge of the handlebar comprises a cylindrical lock housing, a cylindrical handle bar support at least partly fitting coaxially within the lock housing, and a tracer pin configured to guide rotation of the handle bar support relative to the lock housing about a tilting axis substantially perpendicular to the handlebar between the folding position and the position for use of the handlebar.

8. The scooter according to claim 1 wherein the steering bar is telescopic.

9. The scooter according to claim 7 wherein a tensioner is operably connected to transmit rotation of the handle bar support to movement of a locking pin between a retracted position and a locking position to lock telescopically moveable parts of the steering bar.

10. The scooter according to claim 9 wherein the tensioner is a tensioning cable.

11. The scooter according to claim 9 wherein the tensioner is connected to a wedge translating longitudinal movement of the tensioner to lateral movement of the locking pin.

12. The scooter according to claim 1 and further comprising an electric motor operably connected to drive the rear wheel.

13. The scooter according to claim 12 wherein the electric motor is integral in a wheel rim of the rear wheel.

14. The scooter according to claim 12 comprising a battery and/or associated electronics positioned integrally within the footboard.

\* \* \* \* \*